United States Patent [19]

Nijhuis

[11] 4,353,147

[45] Oct. 12, 1982

[54] APPARATUS FOR STUNNING ANIMALS TO BE SLAUGHTERED, SUCH AS PIGS

[75] Inventor: Johan W. Nijhuis, Winterswijk, Netherlands

[73] Assignee: Machinefabriek G. J. Nijhuis B.V., Netherlands

[21] Appl. No.: 161,298

[22] Filed: Jun. 20, 1980

[30] Foreign Application Priority Data

Jun. 25, 1979 [NL] Netherlands .................. 7904935

[51] Int. Cl.³ ............................................. A22B 3/06
[52] U.S. Cl. ................................................. 17/1 E
[58] Field of Search .............................. 17/1 E, 1 R

[56] References Cited

U.S. PATENT DOCUMENTS 1,857,658  5/1932  Pfretzschner .................. 17/1 E
2,185,949  1/1940  Regensburger ................ 17/1 E
3,996,644  12/1976 Andersson ................... 17/1 E X Primary Examiner—Willie G. Abercrombie
Attorney, Agent, or Firm—Arnold, White & Durkee

[57] ABSTRACT

An apparatus is provided for electrically stunning animals, in particular pigs. The apparatus comprises a restrainer in the form of two endless conveyors positioned to form a V-shaped passageway between opposed operating surfaces which hold an animal and further comprises a pair of electrodes extending downwardly into said passageway. Said electrodes are arranged side by side to engage or contact the sides of the head of the animal. The electrodes are shaped to conform to the contour of an animal's head. Said electrodes preferably are formed by plates having the outwardly turned edge parallel to the adjacent operating surface while the other edges first diverge upwardly and by a curvature merge into converging parts. The plates have a profile such that they also converge in the direction of conveyance.

3 Claims, 2 Drawing Figures

APPARATUS FOR STUNNING ANIMALS TO BE SLAUGHTERED, SUCH AS PIGS

CROSS-REFERENCE TO RELATED APPLICATIONS

This application discloses subject matter related to application Ser. No. 905,371, filed May 12, 1978, now abandoned; co-pending application Ser. No. 147,826 filed May 8, 1980; co-pending application Ser. No. 147,827, filed May 8, 1980; co-pending application Ser. No. 148,033, filed May 8, 1980; application Ser. No. 148,034, filed May 8, 1980, now U.S. Pat. No. 4,319,383; and co-pending application Ser. No. 202,322, filed Oct. 30, 1980.

BACKGROUND OF THE INVENTION

The invention relates generally to an apparatus for electrically stunning animals to be slaughtered, in particular pigs. More specifically, the invention relates to apparatus comprising two endless conveyors which are operated parallel to each other and at a synchronized rate and are positioned to form a substantially V-shaped passageway between the operating surfaces thereof, and a pair of electrodes or sets of electrodes, which are insulated with respect to each other and are adapted to extend downwardly into said V-shaped passageway. Said electrodes are further adapted to engage the head of the animal to be stunned and to clear said passageway. Means is provided to substantially eliminate or reduce the difference in velocity of the electrodes relative to the conveyors upon closure of the current circuit between said electrodes or said sets of electrodes.

A similar apparatus has been described in co-pending application Ser. No. 147,827, now Pat. No. 4,338,700 which is based upon Dutch patent application 79.03681 not published in advance, which patent application constitutes a further development of the apparatus disclosed in application Ser. No. 905,371, which is based upon Dutch patent application 77.05519.

In the apparatus disclosed in the aforementioned applications, the electrodes or sets of electrodes are arranged in a spaced relationship to each other in line with the direction of conveyance. Consequently, the animal transported by the conveyors is first engaged by the first electrode or first set of electrodes which slides across the head of the animal, and only upon engagement with the second electrode or the second set of electrodes a current starts to flow. Initially, the current is of slight intensity for determining whether a proper contact has been made, and, upon detecting a proper contact, a jolt of current of sufficient intensity to cause the stunning is applied.

As has been explained already in application Ser. No. 147,827, based upon Dutch patent application 70.03681, when stunning one has to take care that no improper or insufficient current passage occurs during stunning, because such an improper or insufficient stunning current will tend to result in damaging or reducing the quality of the meat of the animal to be slaughtered. The current passage or flow required for the stunning should also pass directly through the head of the animal at the correct potential and correct intensity. When such current passage or flow is insufficient or improper, muscular contractions may occur in the animal causing bone breakage and internal bleeding. The meat of such an animal must then be classified as a lower quality grade or class.

Conventional manual stunning may be accomplished by using stunning rods which may be manually placed upon the animal and made to engage the head of the animal either in the longitudinal direction with respect to the animal's body or in a direction transverse thereto. When manual stunning is performed at a slow production rate, the percentage of animals that may not be considered to be of prime quality because of internal bleeding and bone breakage is relatively low and amounts to only a few animals per one thousand. Manual stunning presents, however, the drawback of limited production rates, because human operators are not capable of performing manual stunning above certain low production rates without seriously affecting efficiency. When attempting to increase production rates with manual stunning, the drop out percentage increases because the operators performing the manual stunning are subjected to great stress.

Furthermore, to avoid the situation where the animal to be stunned only loses motor neuron control and hence only seems to be stunned but has not been rendered unconscious it is desirable to use a higher voltage than would be safe for human operators.

Previously, my prior apparatus disclosed in application Ser. No. 905,371, caused a higher drop out percentage than that occurring from manual stunning, i.e., a greater percentage of lower quality grade meat was obtained from animals automatically stunned with my prior apparatus as opposed to those stunned with manual stunning techniques. As a consequence thereof, there has been an assiduous search for further improvements of automatic stunning apparatus, such as the provision of a dampening device for dampening the movements of the electrodes as disclosed in co-pending application Ser. No. 147,826, which is based upon Dutch patent application 79.03678; the maintenance of a fixed distance between the electrodes as disclosed in co-pending application Ser. No. 147,826, which is based upon Dutch patent application 79.03680; and the joint or simultaneous movement of the electrodes and the animal as disclosed in co-pending application Ser. No. 147,826, which is based upon Dutch patent application 79.03681. Although these improvements aid in decreasing the drop out percentage caused by improper automatic stunning, the apparatus of the present invention provides even more efficiency.

A feature of the present invention is to provide an apparatus in which the occurrence of dropout will be lower than that in manual stunning.

SUMMARY OF THE INVENTION

This feature is now achieved by using two electrodes or sets of electrodes which are arranged side by side in the passageway and which are of such a shape and have been mounted in such a manner that they are operative to engage the sides of the head of the animal substantially at the same time. The electrodes are not positioned in a consecutive manner but are positioned side by side so that the current will pass transversely through the brains of the animal. When applying the consecutive electrode arrangement, the animal could already become disquieted upon being engaged or contacted by the first electrodes. This situation is now prohibited. In the present arrangement the animal will be engaged or contacted by both the electrodes substantially at the same time. Thereupon, a sensing current of low voltage will start to flow, indicating whether the proper resistance is presented or not. Every kind of animal presents its own specific resistance so that it is therefore possible to determine whether the animal is, e.g., a pig or not on the basis of this current. When a current connection between the electrodes is established in this manner, this being the case when the electrodes engage the head of the animal in the proper way, the main current is switched in and the stunning occurs.

In accordance with the present invention, automatic stunning may be attained at a dropout percentage that is not only lower than that in the older apparatus used for automatic stunning but also is lower than that achieved by manual stunning, particularly in manual stunning wherein the electrodes are placed upon the animal's head in a transverse manner. While maintaining the proper quality, that is, at an equally low dropout percentage, the production may now be increased considerably.

Preferably, the apparatus is constructed in such a manner that the two electrodes comprise two plates, the outer edges of which are substantially parallel to each other and are disposed adjacent or in close proximity to the operating surfaces of said conveyors. The edges, which face each other, diverge from the lower ends thereof in an upward direction up to about half the height of said plates whereupon by means of a curvature said latter edges merge into a converging portion. In other words, the electrodes are shaped to conform to the contour of the head of an animal. When utilizing this shape, the possibility that the animal will put its head into the gap between one electrode and one conveyor is eliminated or minimized. In practice, it has been observed that the animal will seek the space between the two electrodes whereby the snout of the animal will seek more or less unintentially the correct position with respect to the electrodes so that these electrodes will pass across the sides of the snout and head. The current will then be switched in at the correct moment while using optionally, apart from the above mentioned sensing current, an adjustable time relay, which may be of a conventional construction, so that the current will pass with certainty transversely through the brains at the correct position. When the stunning jolt of current is switched in, a movement is imparted to the electrodes, e.g., in the way described in co-pending application Ser. No. 147,827, which is based upon Dutch patent application 79.03681 so that proper contact is ensured. The difference in velocity between the conveyors and the electrodes is then reduced substantially to zero.

Preferably, when viewed in the direction of conveyance, the electrodes have been mounted or shaped in a V-shaped or arcuate manner so that the parts of said two electrodes or sets of electrodes which are at the closest distance to each other also extend farthest to the front in the direction of conveyance. It is preferred that this V-shape or arcuate shape is most pronounced and half the height of the electrodes. This shape is the most favorable for catching the head of the animal in the most appropriate way.

BRIEF DESCRIPTION OF THE DRAWINGS

The invention will now be described in further detail with reference to the appended drawing, in which.

DESCRIPTION OF A PRESENTLY PREFERRED EMBODIMENT

Figure 1:
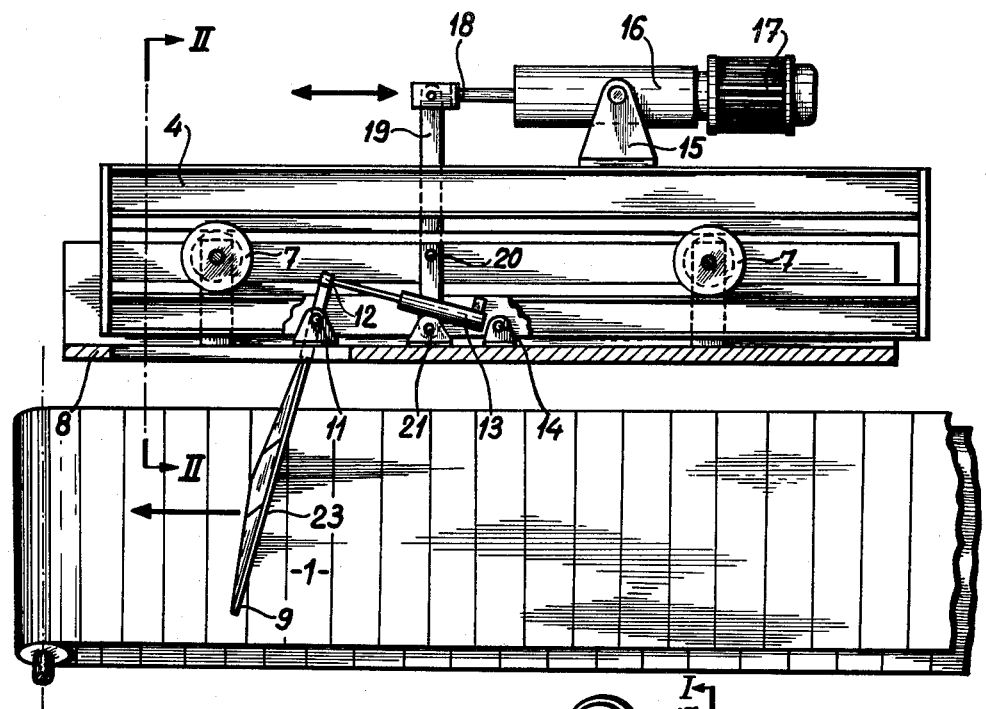
FIG. 1 is a side elevation, partially in cross section, of the apparatus according to the present invention.

With reference to FIG. 1 two conveyors 1 and 2 are shown, which are positioned to form a substantially V-shaped passageway between which animals may be transported in a way known per se.

Figure 2:
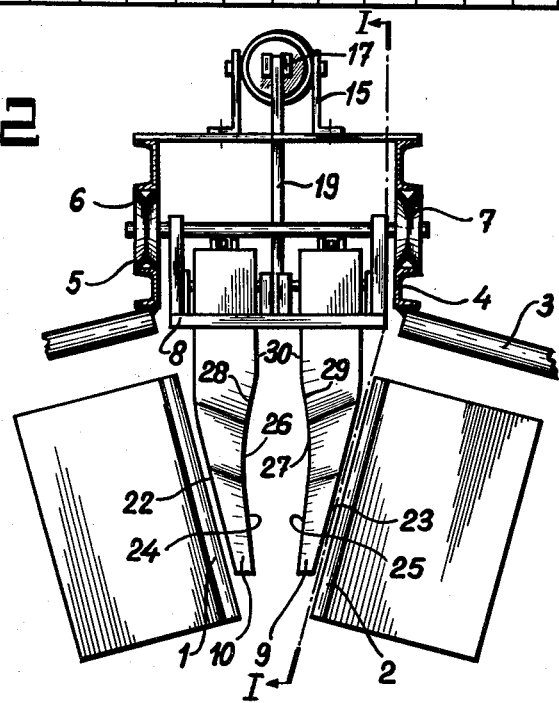
FIG. 2 shows a cross section taken along the line II—II in FIG. 1.

On top of frame 3 of the apparatus, which is only indicated schematically in FIG. 2, is affixed frame 4. Said frame 4 comprises lower and upper U-shaped profiles or members, the flanges of which face each other. The U-shaped members are provided with V-shaped rail surfaces 5 and 6 for runners 7 of a frame 8.

On said frame 8, two electrodes 9 and 10 are rotatably mounted on a shaft 11 and are hingedly coupled to a dampening spring 13 by rod 12. Said spring is hingedly fastened to the frame 8 at 14. In a way not shown but known per se the electrodes 9 and 10 are insulated with respect to each other on the shaft 11 as well as with respect to the frame 8. In a way not shown the electrodes are connected to current conductors.

On top of the frame 4 is a support 15 in which there has been fastened a hydraulic cylinder 16, including a motor driven pump 17 coupled thereto. Piston rod 18 of the cylinder 16 has been coupled by means of a lever 19 to the frame 4 and to the frame 8 at 20 and at 21, respectively. A movement of the piston rod to the right-hand side, with respect to FIG. 1, causes movement of the frame 8 together with the electrodes in the direction of conveyance.

The electrodes 9 and 10 possess outer side edges 22 and 23, respectively which run parallel to the operating surfaces of the conveyors 1 and 2 and at close proximity thereto.

The inner edges of electrodes 9 and 10 facing each other possess diverging lower portions 24 and 25 which merge through curvatures 26 and 27, respectively, into converging portions 28 and 29, which finally merge into parallel edge portions 30.

In horizontal cross section, each one of the electrodes is curved, the strongest curvature being present at the level of the portion 26 and 27, respectively. This curvature is such that, when viewed in the direction of conveyance, the edges 26 and 27, will be present in front of the edges 22 and 23, respectively and will preferably form part of an arc. In the lower portion and in the upper portion, that is, the portions having diverging edges 24 and 25 and converging edges 28 and 29, respectively, this curvature may be less pronounced. In an alternate embodiment, when viewed from below, the lower portions of the electrodes may constitute flat planes positioned to form a V-shaped border line or configuration, said planes either maintaining said V-shape though at a change of the angle or merging into a curvature.

It is to be understood that the invention will admit of other embodiments. The description of the presently preferred embodiment is given only to facilitate understanding of the invention by those skilled in the art and should not be construed as limiting the invention.

I claim:

1. An apparatus for electrically stunning animals to be slaughtered, comprising:
    two endless conveyors, said conveyors being operable to run parallel to each other and at a synchonized rate and being positioned to form a substantially V-shaped passageway between the operating surfaces thereof;

a pair of electrodes carried by a movable frame, said electrodes being insulated with respect to each other and being adapted to extend into said V-shaped passageway, said electrodes being further adapted to engage the head of the animal to be stunned and to clear said passageway; and means for moving said movable frame, said means being adaptable to move said movable frame at said synchronized rate, the two electrodes being arranged side by side in said passageway, said electrodes being of such a shape and mounted in such a manner that they are operative to engage the sides of the head of the animal substantially at the same time.

2. The apparatus according to claim 1, characterized in that the two electrodes consist of two plates, the outer edges of which are substantially parallel to the respective operating surfaces and run at close proximity of the pertaining operating surfaces of said conveyors and the edges of which facing each other diverge from the lower end thereof in upward direction up to about half the height of said plates, whereupon by means of a curvature said latter edges merge into a converging portion.

3. The apparatus according to claim 1 or 2, characterized in that when viewed in the direction of conveyance, the electrodes have been mounted or shaped in such a V-shaped or arcuate manner, respectively, that the parts of said two electrodes or sets of electrodes, respectively, at closest distance from each other extend also farthest to the front in the direction of conveyance.

* * * * *

UNITED STATES PATENT AND TRADEMARK OFFICE
CERTIFICATE OF CORRECTION

PATENT NO. : 4,353,147

DATED : October 12, 1982

INVENTOR(S) : Johan W. Nijhuis

It is certified that error appears in the above-identified patent and that said Letters Patent is hereby corrected as shown below:

Column 4, line 65, change "syncho-" to -- synchro --.

Column 5, line 15, change "characterized" to -- wherein --; line 16, delete "in that"; change "consist of" to --comprise--.

Column 6, line 2, after "surfaces" insert -- of the conveyors --; delete "run at" and insert therefor -- extend in --; line 3, delete "of"(1st. occurr.) and insert therefor--to--delete "pertaining"; insert a comma after "conveyors"; line 4, delete "and the" and insert therefor -- said --; delete "of which"; delete "diverge" and insert therefor -- and diverging --; line 5, after "in" insert -- an --; line 6, delete "whereupon by means of" and insert therefor -- forming --; line 7, insert a comma after "curvature"; delete "latter"; delete "merge" and insert therefor "further merging"; line 9, delete "character-" and insert therefor -- wherein --; line 10, delete "ized in that when viewed in the direction of convey-"; line 11, delete "ance,"; delete "have been mounted or" and insert therefor -- are --; after "shaped" insert -- , when viewed in the direction of conveyance, --; line 12, delete "a" and insert therefor -- an --; delete "V-shaped or"; delete ", respectively,"; line 13, delete "or sets of electrodes,"; line 14, delete "respectively,"; after "at" insert "the"; line 15, delete "also".

Signed and Sealed this

Twenty-second Day of February 1983

[SEAL]

Attest:

GERALD J. MOSSINGHOFF

*Attesting Officer*  *Commissioner of Patents and Trademarks*